(12) United States Patent
Choi

(10) Patent No.: US 9,308,865 B2
(45) Date of Patent: Apr. 12, 2016

(54) VEHICLE SIDE REAR-VIEW MIRROR ASSEMBLY HAVING A MEANS FOR EXPOSING A BLIND SPOT

(71) Applicant: Oscar Yonghwan Choi, Los Angeles, CA (US)

(72) Inventor: Oscar Yonghwan Choi, Los Angeles, CA (US)

( * ) Notice: Subject to any disclaimer, the term of this patent is extended or adjusted under 35 U.S.C. 154(b) by 89 days.

(21) Appl. No.: 14/132,806

(22) Filed: Dec. 18, 2013

(65) Prior Publication Data

US 2015/0165976 A1  Jun. 18, 2015

(51) Int. Cl.
*G02B 7/182* (2006.01)
*B60R 1/00* (2006.01)
*B60R 1/02* (2006.01)
*B60R 1/08* (2006.01)

(52) U.S. Cl.
CPC ............. *B60R 1/007* (2013.01); *B60R 1/025* (2013.01); *B60R 1/081* (2013.01)

(58) Field of Classification Search
CPC combination set(s) only.
See application file for complete search history.

(56) References Cited

U.S. PATENT DOCUMENTS

| 3,749,480 | A | * | 7/1973 | De Witt | B60R 1/025 359/843 |
| 5,097,362 | A | * | 3/1992 | Lynas | B60R 1/025 359/843 |
| 5,159,497 | A | * | 10/1992 | Lynas | B60R 1/06 359/843 |
| 6,224,220 | B1 | * | 5/2001 | Duroux | B60R 1/074 359/872 |
| 6,350,037 | B1 | * | 2/2002 | Adams | B60R 1/025 307/10.2 |
| 6,824,282 | B1 | * | 11/2004 | Morrell | B60R 1/025 359/874 |

* cited by examiner

*Primary Examiner* — Bumsuk Won
*Assistant Examiner* — Balram Parbadia
(74) *Attorney, Agent, or Firm* — East West Law Group; Heedong Chae

(57) ABSTRACT

A vehicle side rear-view mirror assembly that has a structure for exposing a blind spot. The assembly includes a mirror housing mounted on a vehicle; a support frame fixedly mounted on the vehicle; a backing plate movably connected to the support frame; a mirror glass; connecting rods which connect the mirror glass to the backing plate wherein the mirror glass is pivoted on the connecting rods about a rotating axis defined by the connecting rods; and a motion actuator mounted on the backing plate for rotating the mirror glass about the rotating axis. The assembly further includes a two-motor powered adjustment structure for adjusting an orientation of the backing plate in which the two-motor powered adjustment structure is fixedly mounted on the support frame.

24 Claims, 8 Drawing Sheets

VEHICLE SIDE REAR-VIEW MIRROR ASSEMBLY HAVING A MEANS FOR EXPOSING A BLIND SPOT

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates to a side rear-view mirror assembly of a vehicle and, more particularly, to a vehicle side rear-view mirror assembly having a means for exposing a blind spot. The assembly includes a motion actuator to quickly rotate the mirror glass to expose a blind spot so that a driver can view the blind spot through the mirror glass.

BACKGROUND OF THE INVENTION

While driving a vehicle, a driver must constantly review his surroundings to avoid a collision. Side rear-view mirrors assist a driver in reviewing the surroundings generally disposed behind the driver without the driver having to turn his head more than necessary.

Blind spots exist on either side of the vehicle. Blind spots are spaces that are not visible to the driver through the rear-view mirrors and the driver must turn his head to view the blind spots.

Customarily, the side rear-view mirrors are provided with means for adjusting the orientation of the mirrors. For an electrically powered adjustment, two electric motors are generally provided, one for adjusting the orientation about a vertical axis and the other for adjusting the orientation about a horizontal axis.

However, these adjusting devices are not suitable for a driver to use for exposing blind spots while driving because the devices rotate the mirrors very slowly and using such devices while driving can be very dangerous.

Various means for exposing blind spots by rotating the side rear-view mirrors have been introduced, but they operate rather slowly and lack mechanism to avoid interference between such means and the existing adjusting devices. To be effective, the blind spot exposing means should work very fast. A means for exposing blind spots requires at least one motor or motion actuator and the adjusting devices usually include two motors. Three motors may cause physical interference with each other and make the structure unnecessarily complicated and expensive to manufacture.

Accordingly, to solve the above problems, a need for a vehicle side rear-view mirror assembly having a means for exposing a blind spot. has been present for a long time considering the expansive demands in the everyday life. This invention is directed to solve these problems and satisfy the long-felt need.

SUMMARY OF THE INVENTION

The present invention contrives to solve the disadvantages of the prior art. The present invention provides a vehicle side rear-view mirror assembly having a means for exposing a blind spot.

The object of the invention is to provide a vehicle side rear-view mirror assembly having a means for exposing a blind spot, which includes a mirror housing mounted on a vehicle; a support frame fixedly mounted on the vehicle; a backing plate movably connected to the support frame; a mirror glass; a connecting means which connects the mirror glass to the backing plate wherein the mirror glass is pivoted on the connecting means about a rotating axis defined by the connecting means; and a motion actuator mounted on the backing plate for rotating the mirror glass about the rotating axis. The assembly further includes a two-motor powered adjustment means for adjusting an orientation of the backing plate in which the two-motor powered adjustment means is fixedly mounted on the support frame.

Another object of the invention is to provide a vehicle side rear-view mirror assembly having a means for exposing a blind spot in which a motion actuator of the assembly quickly rotates a mirror glass to expose blind spots and side lanes so that a driver can view the blind spots and measure the distance between the driver's vehicle and the vehicle, if any, in the blind spot through the mirror glass.

Still another object of the invention is to provide a vehicle side rear-view mirror assembly having a means for exposing a blind spot in which the motion actuator is a linear solenoid for pushing and pulling the mirror glass. The linear solenoid operates very quickly and its response time is very short.

The advantages of the present invention are: (1) the present invention provides a vehicle side rear-view mirror assembly having a means for exposing a blind spot which a driver is driving a vehicle; (2) the side rear-view mirror assembly of the present has a very simple structure; (3) the side rear-view mirror assembly of the present has a motion actuator which operates and rotate the mirror glass very quickly; (4) in the present invention, the orientation adjustment means and the blind spot exposing mechanism are well organized in a simple structure and can coexist without interference with each other; (5) because of its simple structure, the side rear-view mirror assembly of the present invention operates very quickly, precisely and effectively; and (6) the switch of the present invention is easy to use and convenient to control.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings.

Figure 1:
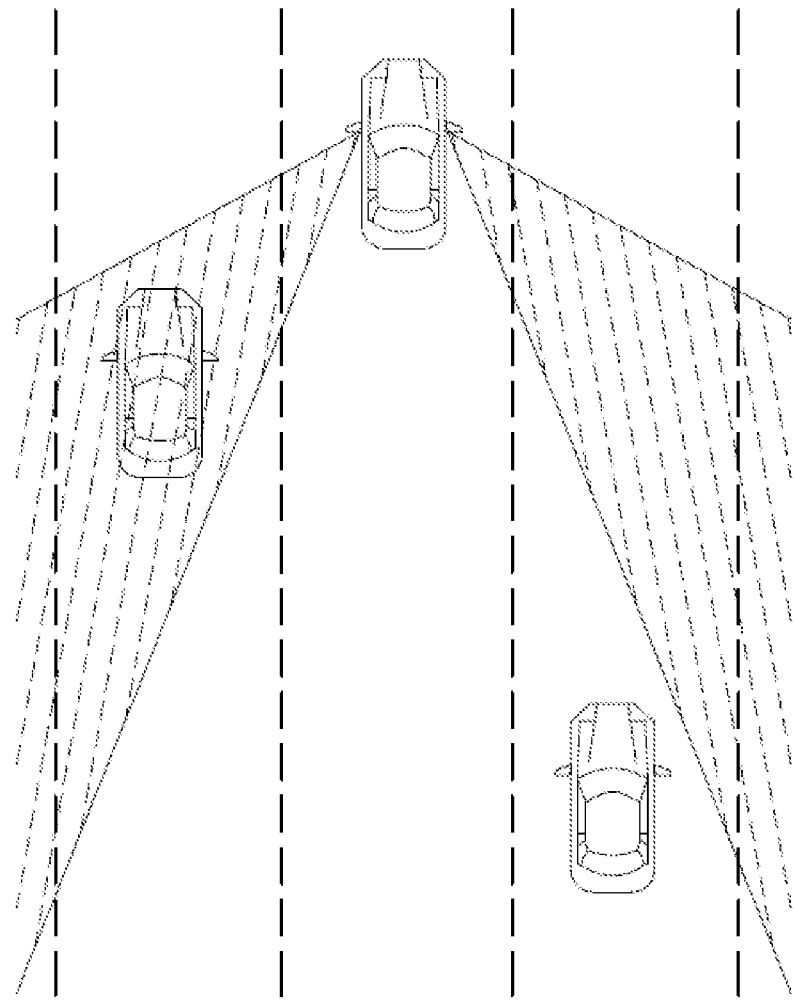
FIG. 1 shows blind spots.

FIG. 1 shows blind spots that a driver cannot view through the side-rear view mirrors without turning his head more than a minimal amount.

Figure 2:
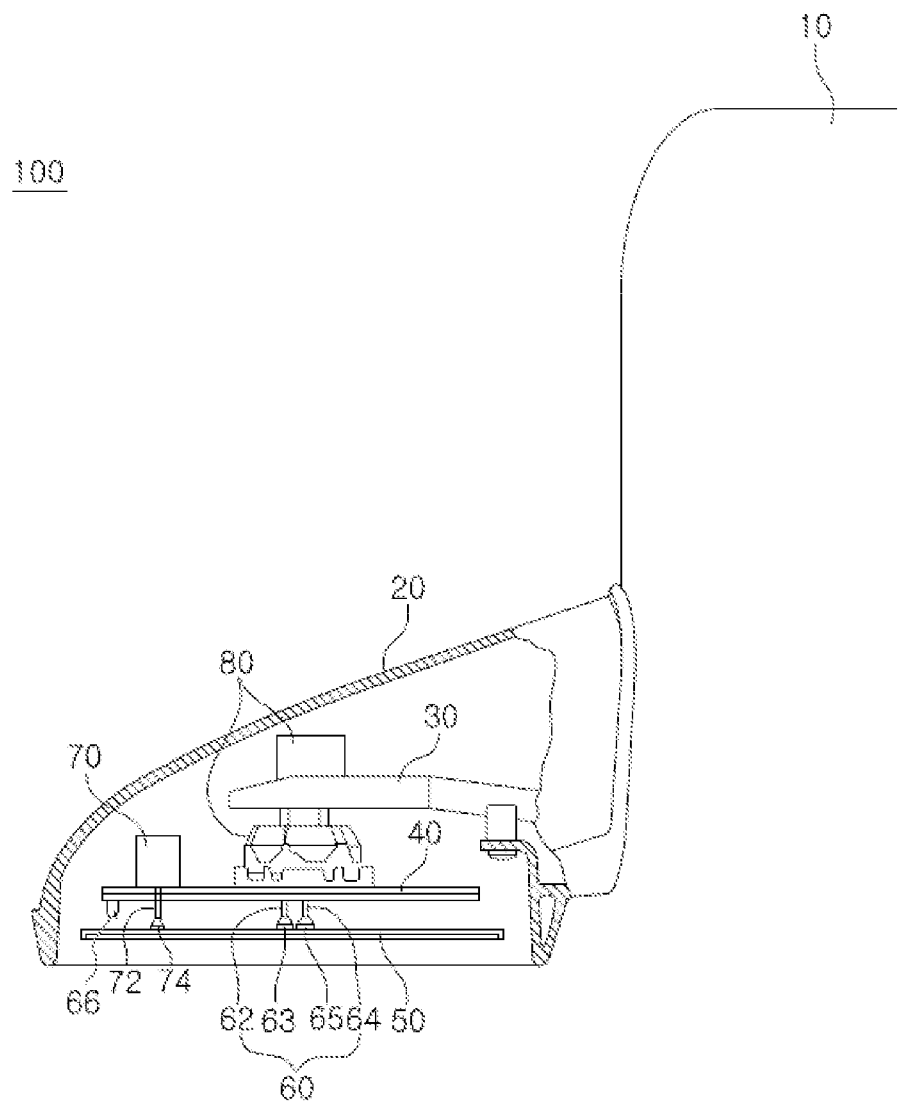
FIG. 2 shows a cross sectional view of a side rear-view mirror according to the present invention.

FIG. 2 shows is a top view, partially cutaway, of a vehicle side rear-view mirror assembly 100 having a means for exposing a blind spot according to the present invention. The vehicle side rear-view mirror assembly 100 includes a mirror housing 20 mounted on a vehicle 10; a support frame 30 fixedly mounted on the vehicle 10; a backing plate 40 movably connected to the support frame 30; a mirror glass 50 or a reflective member; a connecting means 60 which connects the mirror glass 50 to the backing plate 40 in which the mirror glass 50 is pivoted on the connecting means 60 about a rotating axis 90 which is defined by the connecting means 60; and a motion actuator 70 fixedly mounted on the backing plate 40 for rotating the mirror glass 50 about the rotating axis 68.

The vehicle side rear-view mirror of the present invention further includes a two-motor powered adjustment means 80 for adjusting an orientation of the backing plate 40 in which the two-motor powered adjustment means 80 is fixedly mounted on the support frame 30.

Conventionally, a rear-view mirror assembly generally has an orientation adjustment means which uses two motors to adjust the orientation of the rear-view mirror by horizontally and/or vertically rotating the rear-view mirror. The rear-view mirror is usually fixedly attached to a backing plate, and technically, the two motors rotate the backing plate. The orientation adjustment means is only to adjust the orientation of the rear-view mirror when a vehicle is not driving, and the orientation adjustment means is not suitable for a use to expose a blind spot while driving a vehicle because the two motors rotate the rear-view mirror very slowly.

In the present invention, however, the motion actuator 70 is installed in addition to the orientation adjustment means. The orientation adjustment means is preferably a two-motor powered adjustment means 80. The motion actuator 70 operates very quickly in response to the operation of a switch 90 and it 70 is fixedly mounted on the backing plate 40. The mirror glass 50 is pivoted on both of the backing plate 40 and the motion actuator 70, and thus, when the motion actuator 70 does not operate, the mirror glass 50 is fixedly mounted on the backing plate 40. Because the mirror glass 50 is fixedly mounted on the backing plate 40, the orientation of the mirror glass 50 can be adjusted by the two-motor powered adjustment means 80 when the motion actuator 70 does not operate. While driving, however, the orientation of the mirror glass 50 can be changed very quickly by the operation of the motion actuator 70 in order for a driver to view a blind spot through the mirror glass 50.

The connecting means 60 may include a first connecting rod 62 and a second connecting rod 64, and first and second joints 63, 65 are provided on an end of the first connecting rod 62 and an end of the second connecting rod 64. The first and second joints 63, 65 may be a rotating joint, a pivot joint, or a hinge joint, and they 63, 65 are preferably a ball and socket joint 63, 65. The first ball and socket joint 63 is provided on an end of the first connecting rod 62 and the second ball and socket joint 65 is provided on an end of the second connecting rod 64. The rotating axis 68 is defined by a line through the joints 63, 65 and the mirror glass 50 rotates about the rotating axis 68 by the motion actuator 70.

The first connecting rod 62 may be coupled by the first joint 63 to the mirror glass 50 and the second connecting rod 64 may be coupled by the second joint 65 to the mirror glass 50. Alternatively, the first connecting rod 62 is coupled by the first joint 63 to the backing plate 40 and the second connecting rod 64 is coupled by the second joint 65 to the backing plate 40. Accordingly, an end of a connecting rod 62, 64 is coupled to one of the mirror glass 50 and the backing plate 40, and the other end of a connecting rod 62, 64 is fixedly attached to the other of the mirror glass 50 and the backing plate 40.

Figure 3:
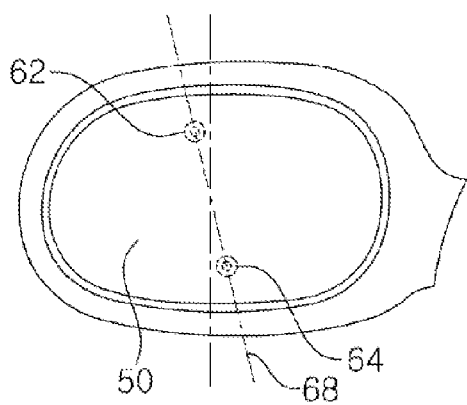
FIGS. 3 and 4 show rotating axes of the present invention for the left and right side rear-view mirrors.
Figure 4:
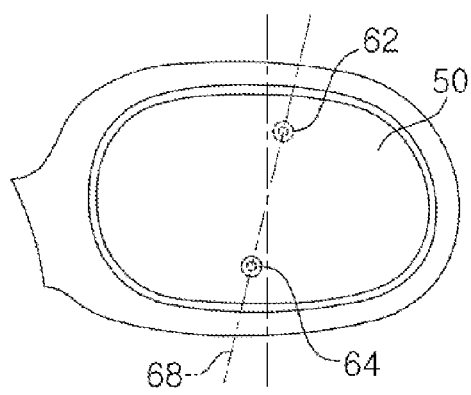

As shown in FIGS. 3 and 4, the first connecting rod 62 is disposed farther away from the vehicle 10 than the second connecting rod 64 and the first connecting rod 62 is disposed above the second connecting rod 64. By this arrangement, the rotating angle 68 is tilted outwardly relative to the vehicle 10. Preferably, the left motion actuator 70 rotates the left mirror glass 50 about 5 degrees outwardly relative to the vehicle 10 and about 5 degrees toward a bottom side, and the right motion actuator 70 rotates the right mirror glass 50 about 13 degrees outwardly relative to the vehicle 10 and about 5 degrees toward a bottom side.

In the structure as in FIGS. 2, 3 and 4, the motion actuator 70 pulls the mirror glasses 50 to expose the blind spots. Alternatively, in FIG. 2, the motion actuator 70 may be placed in the side of the vehicle 10 with respect to the rotating angle 68, and the motion actuator 70 pushes the mirror glasses 50 to expose the blind spots.

Figure 5:
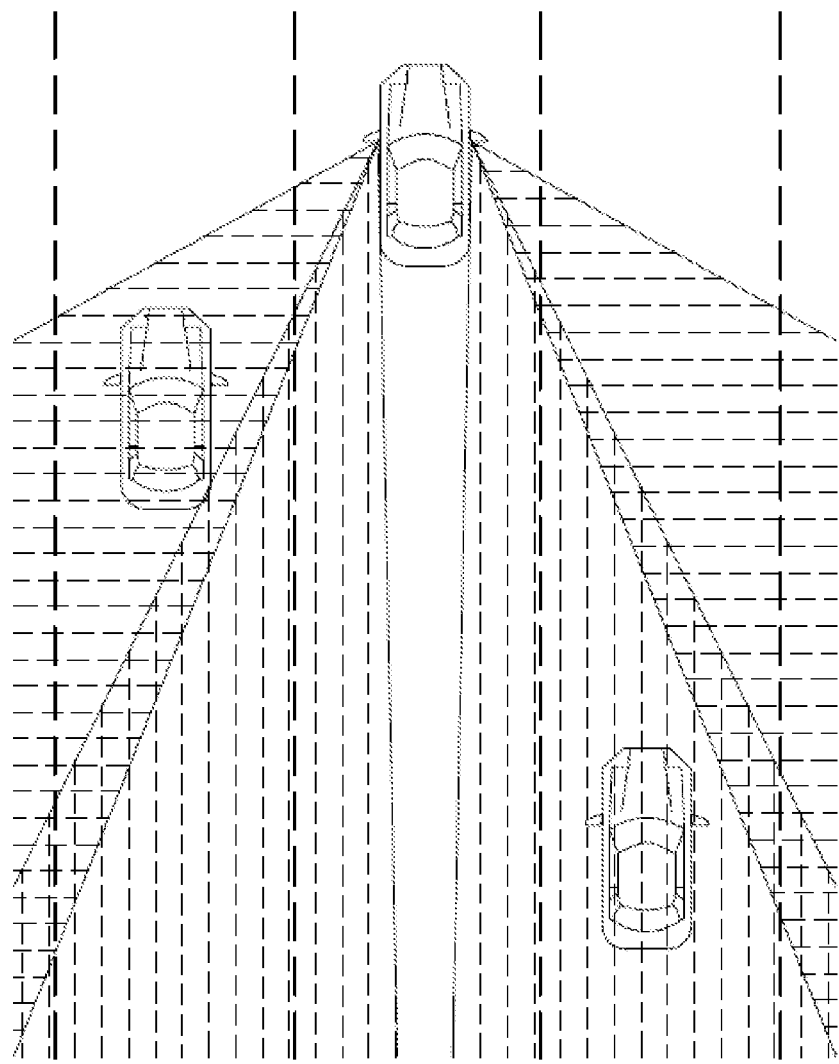
FIG. 5 shows a field of view when the motion actuator of the present invention is and is not activated.

FIG. 5 shows the field of view when the motion actuator is and isn't activated.

Figure 6A:
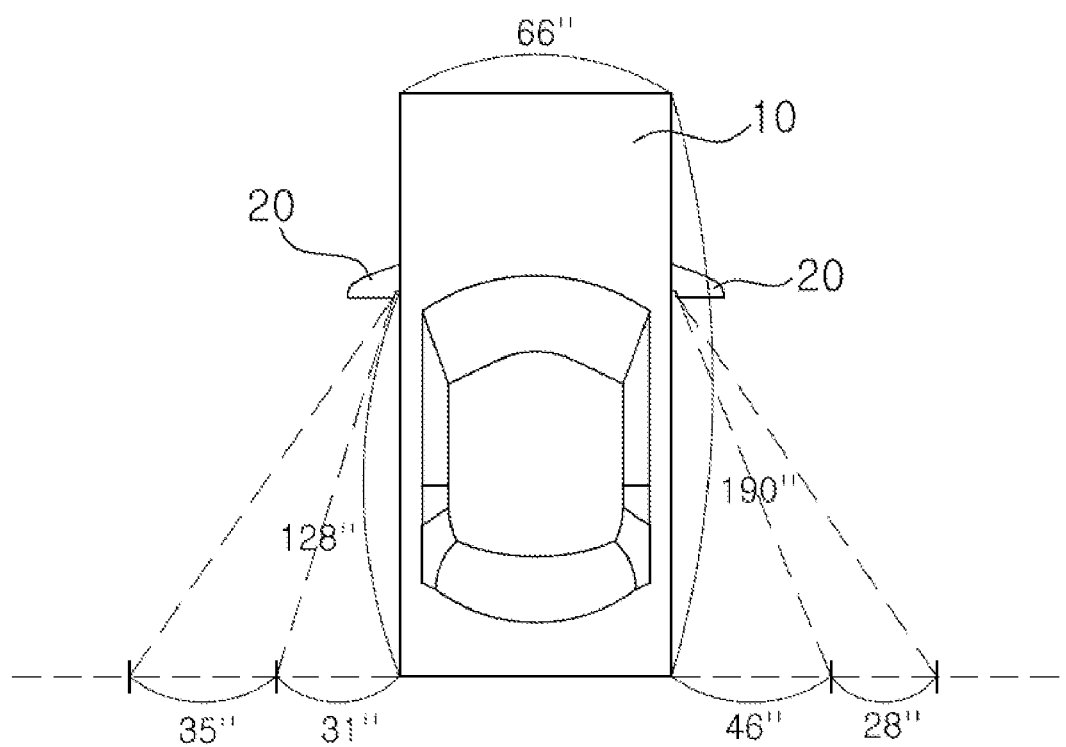
FIG. 6(a) shows an example of dimensions for the field of view when the motion actuator is and is not activated.
Figure 6B:
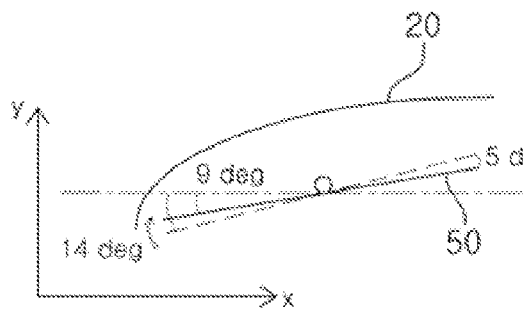
FIGS. 6(b), 6(c) 6(d), and 6(e) examples of degrees for which the mirror glass rotates to expose blind spots.
Figure 6D:
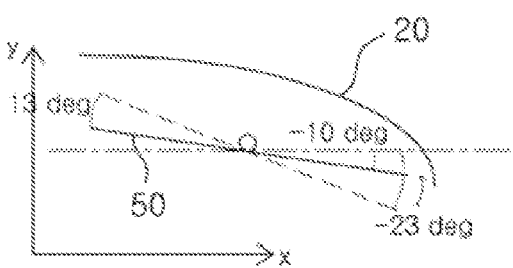
Figure 6C:
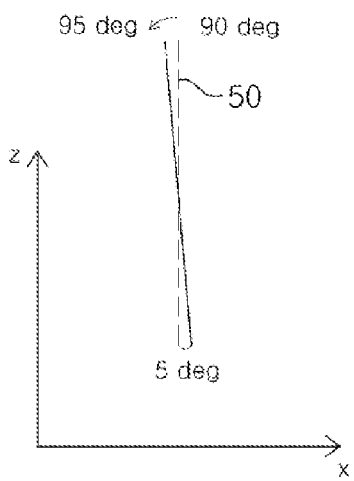

FIGS. 6(a)~6(e) show the orientations of the mirror glass 50 on an X-Y plane and an X-Z plane before and after it 50 is rotated by the motion actuator 70. The broken lines show the orientations of the mirror glass 50 before the rotation whereas the solid lines show the orientations after the rotation. For the left side rear mirror 50, the original angle of the rear mirror 50 is 14 degrees on the X-Y plane and 90 degrees on the X-Z plane as shown in FIGS. 6(b) and 6(c). After the rear mirror 50 is rotated by the motion actuator 70, the angle of the rear mirror 50 is 9 degrees on the X-Y plane and 95 degrees on the X-Z plane.

Figure 6E:
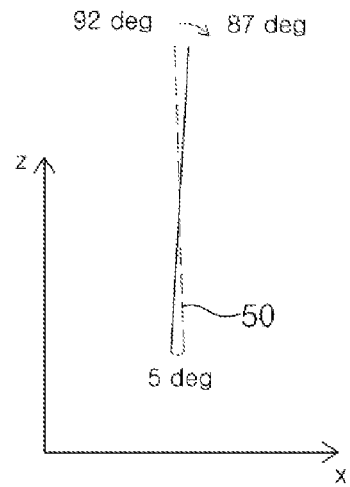

For the right side rear mirror 50, the original angle of the rear mirror 50 is –23 degrees on the X-Y plane and 92 degrees on the X-Z plane as shown in FIGS. 6(d) and 6(e). After the rear mirror 50 is rotated by the motion actuator 70, the angle of the rear mirror 50 is –10 degrees on the X-Y plane and 87 degrees on the X-Z plane.

The angles in FIGS. 6(a)~6(e) are one example for a person of average sizes and they may vary depending on other factors, such as a person's sizes, viewing preferences, and so forth.

These angles are for a person of average sizes and may vary depending on a person's sizes, preference in his field of view through the rear mirrors 50, etc.

Experiments show that what is more critical is the degree of rotation. For the left side mirror glass 50 to expose blind spots, the left side mirror glass 50 is preferably rotated about 5 degrees outwardly relative to the vertical axis-z and about 5 degrees downwardly relative to the horizontal axis-x. For the right side mirror glass 50 to expose blind spots, the left side mirror glass 50 is preferably rotated about 13 degrees outwardly relative to the vertical axis-z and about 5 degrees downwardly relative to the horizontal axis-x.

Figure 7:
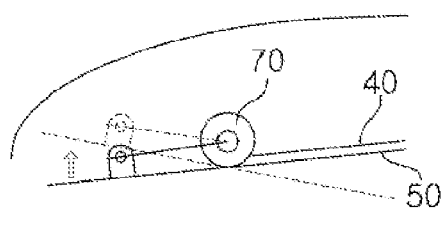
FIG. 7 shows another embodiment of the present invention.
Figure 8:
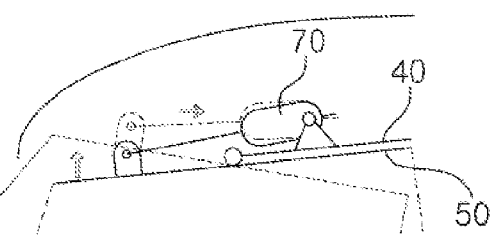
FIG. 8 shows still another embodiment of the present invention.

FIGS. 2, 7 and 8 show different types of the motion actuator 70. The motion actuator 70 may be a linear solenoid for pushing and pulling the mirror glass 50 and the linear solenoid 70 may comprise a thrust pin 72 which is coupled to the mirror glass 50 by a joint 74. The joint 74 may be a rotating joint, a pivot joint, a hinge joint, or a ball and socket joint, and preferably, a ball and socket joint. The linear solenoid 70 is preferable because it operates very quickly and the response time is very short.

Alternatively, the motion actuator 70 may be an electric motor 70, which is adapted to provide a linear motion, for pushing and pulling the mirror glass 50.

The motion actuator 70 may be configured to generate a rotational movement for a predetermined angle as shown in FIG. 7 and the rotational movement of the motion actuator 70 may rotate the mirror glass 50.

The motion actuator 70 may be fixedly mounted on the backing plate 40 as in FIG. 2 or pivoted to the backing plate 40 as in FIG. 8.

In FIGS. 7 and 8, the solid lines show the mirror glass 50 before it is rotated by the motion actuator 70 and the broken lines show the mirror glass 50 after it is rotated by the motion actuator 70.

The side rear-view mirror assembly 100 of the present invention may further include an abutment stop 66 to limit the rotational movement of the mirror glass 50. The abutment stop 66 is fixedly mounted on the backing plate 40 and protruded toward the mirror glass 50.

Figure 9A:
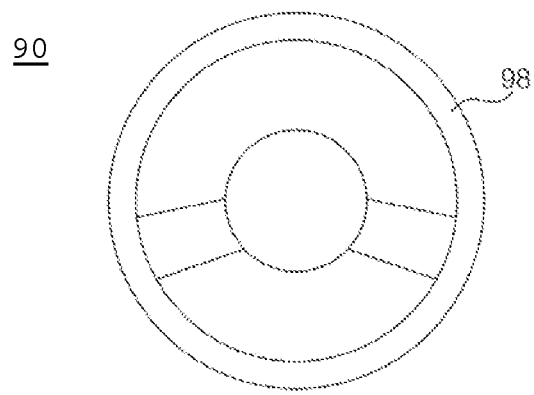
FIGS. 9(a), 9(b) and 9(c) show a switch to activate the motion actuator according to the present invention.
Figure 9B:
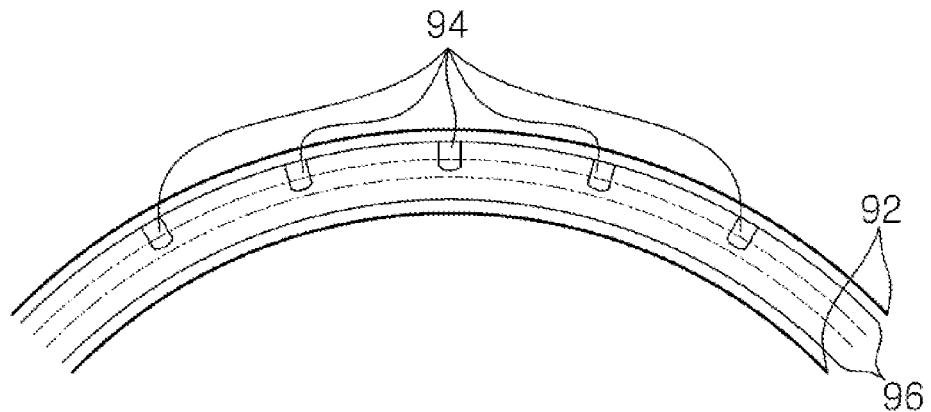
Figure 9C:
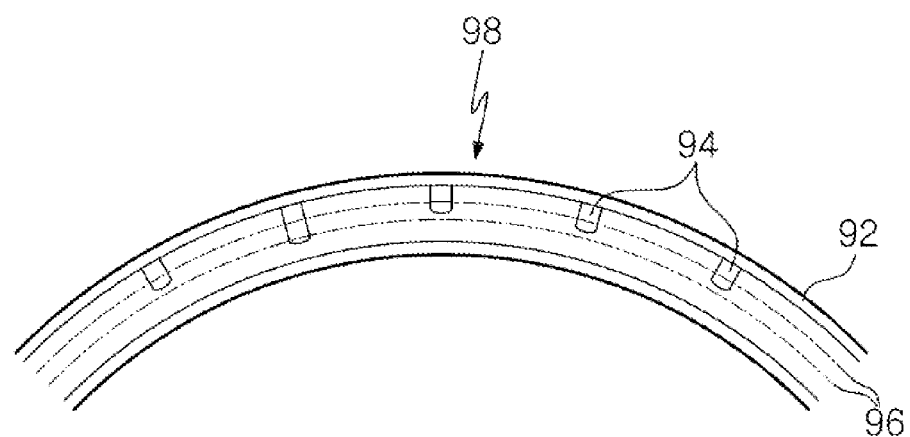

FIGS. 9(*a*)~(*c*) show a switch 90 to activate the motion actuator 70 in order to rotate the mirror glass 50. The vehicle side rear-view mirror assembly 100 further includes a switch 90, preferably installed on a steering wheel 98 of the vehicle 10 for activating the motion actuator 70 wherein if the switch 90 is on, the motion actuator 70 rotates the mirror glass 50 and if the switch 90 is off, the motion actuator 70 rotates the mirror glass 50 back to its original angle and orientation.

The switch 90 may include an outer cover 92 which covers the steering wheel 98 wherein the outer cover 92 is rotatable with respect to the steering wheel 98; a plurality of electrically conductive metal pieces 94 disposed on and attached to an inner side of the outer cover 92; and two conductive wires 96 disposed between the outer cover 92 and the steering wheel 98 along a curve of the steering wheel 98. The switch 90 is turned on when a driver rotates the outer cover 92 so that at least one conductive metal piece 94 rotates and connects the two conductive wires 96 in order for electricity to flow between the two conductive wires 96.

Generally, a vehicle has two side rear view mirrors 100. A vehicle side rear-view mirror system having a means for exposing a blind spot according to the present invention comprises a left side rear-view mirror assembly and a right side rear-view mirror assembly. The left side rear-view mirror assembly and the right side rear-view mirror assembly are substantially symmetric to each other. The vehicle side rear-view mirror system further comprises a switch 90 for activating rotational movement of the left side rear-view mirror and the right side rear-view mirror.

When a left turn signal is on, the switch 90 activates rotational movement of the left side rear-view mirror and does not activate rotational movement of the right side rear-view mirror. Furthermore, when a right turn signal is on, the switch 90 activates rotational movement of the right side rear-view mirror and does not activate rotational movement of the left side rear-view mirror. When no turn signal is on, the switch activates rotational movement of both of the left side rear-view mirror and the right side rear-view mirror.

The rotating axis 68 of the left side rear-view mirror assembly is not symmetric to the rotating axis 68 of the right side rear-view mirror assembly.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A vehicle side rear-view mirror assembly having a means for exposing a blind spot, comprising:
    a mirror housing mounted on a vehicle;
    a support frame fixedly mounted on the vehicle;
    a backing plate movably connected to the support frame;
    a mirror glass;
    a connecting means which connects the mirror glass to the backing plate wherein the mirror glass is pivoted on the connecting means about a rotating axis defined by the connecting means;
    a motion actuator mounted on the backing plate for rotating the mirror glass about the rotating axis; and
    a two-motor powered adjustment means for adjusting an orientation of the backing plate wherein the two-motor powered adjustment means is fixedly mounted on the support frame.

2. A vehicle side rear-view mirror assembly having a means for exposing a blind spot, comprising:
    a mirror housing mounted on a vehicle;
    a support frame fixedly mounted on the vehicle;
    a backing plate movably connected to the support frame;
    a mirror glass;
    a connecting means which connects the mirror glass to the backing plate wherein the mirror glass is pivoted on the connecting means about a rotating axis defined by the connecting means; and
    a motion actuator mounted on the backing plate for rotating the mirror glass about the rotating axis, wherein the connecting means comprises a first connecting rod and a second connecting rod.

3. The vehicle side rear-view mirror assembly of claim 2, wherein a first joint is provided on an end of the first connecting rod and a second joint is provided on an end of the second connecting rod.

4. The vehicle side rear-view mirror assembly of claim 3, wherein the rotating axis is defined by a line through the first and second joints.

5. The vehicle side rear-view mirror assembly of claim 4, wherein the first and second joints are a rotating joint, a pivot joint, a hinge joint, or a ball and socket joint.

6. The vehicle side rear-view mirror assembly of claim 3, wherein the first connecting rod is coupled by the first joint to the mirror glass and the second connecting rod is coupled by the second joint to the mirror glass.

7. The vehicle side rear-view mirror assembly of claim 3, wherein the first connecting rod is coupled by the first joint to the backing plate and the second connecting rod is coupled by the second joint to the backing plate.

8. The vehicle side rear-view mirror assembly of claim 3, wherein the first connecting rod is disposed farther away from the vehicle than the second connecting rod and the first connecting rod is disposed above the second connecting rod.

9. The vehicle side rear-view mirror assembly of claim 8, wherein the mirror glass is a left side mirror glass and the rotating axis is tilted relative to a vertical axis,
    wherein the motion actuator rotates the mirror glass such that the mirror glass is rotated about 5 degrees outwardly relative to a vertical axis and about 5 degrees downwardly relative to a horizontal axis.

10. The vehicle side rear-view mirror assembly of claim 8, wherein the mirror glass is a right side mirror glass and the rotating axis is tilted relative to a vertical axis,
wherein the motion actuator rotates the mirror glass such that the mirror glass is rotated about 13 degrees outwardly relative to a vertical axis and about 5 degrees downwardly relative to a horizontal axis.

11. The vehicle side rear-view mirror assembly of claim 2, wherein the motion actuator is a linear solenoid for pushing and pulling the mirror glass.

12. The vehicle side rear-view mirror assembly of claim 11, wherein the linear solenoid comprises a thrust pin which is coupled to the mirror glass by a ball and socket joint.

13. The vehicle side rear-view mirror assembly of claim 2, wherein the motion actuator is an electric motor, which is adapted to provide a linear motion, for pushing and pulling the mirror glass.

14. The vehicle side rear-view mirror assembly of claim 2, further comprising a switch installed on a steering wheel of the vehicle for activating the motion actuator wherein if the switch is on, the motion actuator rotates the mirror glass and if the switch is off, the motion actuator rotates back the mirror glass to an original angle.

15. The vehicle side rear-view mirror assembly of claim 1, wherein the motion actuator is a linear solenoid for pushing and pulling the mirror glass.

16. The vehicle side rear-view mirror assembly of claim 15, wherein the linear solenoid comprises a thrust pin which is coupled to the mirror glass by a ball and socket joint.

17. The vehicle side rear-view mirror assembly of claim 1, wherein the motion actuator is an electric motor, which is adapted to provide a linear motion, for pushing and pulling the mirror glass.

18. The vehicle side rear-view mirror assembly of claim 1, wherein the motion actuator is configured to generate a rotational movement for a predetermined angle and the rotational movement of the motion actuator rotates the mirror glass.

19. The vehicle side rear-view mirror assembly of claim 1, further comprising a switch installed on a steering wheel of the vehicle for activating the motion actuator wherein if the switch is on, the motion actuator rotates the mirror glass and if the switch is off, the motion actuator rotates back the mirror glass to an original angle.

20. A vehicle side rear-view mirror system having a means for exposing a blind spot, comprising:
a left side and a right side rear-view mirror assembly constructed according to claim 1, wherein the left side rear-view mirror assembly and the right side rear-view mirror assembly are substantially symmetric to each other; and
a switch for activating rotational movement of the left side rear-view mirror and the right side rear-view mirror.

21. The vehicle side rear-view mirror system of claim 20, wherein when a left turn signal is on, the switch activates rotational movement of the left side rear-view mirror and does not activate rotational movement of the right side rear-view mirror,
wherein when a right turn signal is on, the switch activates rotational movement of the right side rear-view mirror and does not activate rotational movement of the left side rear-view mirror, and
wherein when no turn signal is on, the switch activates rotational movement of both of the left side rear-view mirror and the right side rear-view mirror.

22. The vehicle side rear-view mirror system of claim 20, wherein the rotating axis of the left side rear-view mirror assembly is not symmetric to the rotating axis of the right side rear-view mirror assembly.

23. The vehicle side rear-view mirror assembly of claim 1, wherein the motion actuator is configured to generate a rotational movement for a predetermined angle and the rotational movement of the motion actuator rotates the mirror glass.

24. A vehicle side rear-view mirror assembly having a means for exposing a blind spot, comprising:
a mirror housing mounted on a vehicle;
a support frame fixedly mounted on the vehicle;
a backing plate movably connected to the support frame;
a mirror glass;
a connecting means which connects the mirror glass to the backing plate wherein the mirror glass is pivoted on the connecting means about a rotating axis defined by the connecting means;
a motion actuator mounted on the backing plate for rotating the mirror glass about the rotating axis; and
a switch installed on a steering wheel of the vehicle for activating the motion actuator wherein if the switch is on, the motion actuator rotates the mirror glass and if the switch is off, the motion actuator rotates back the mirror glass to an original angle,
wherein the switch comprises:
an outer cover which covers the steering wheel wherein the outer cover is rotatable with respect to the steering wheel;
a plurality of electrically conductive metal pieces disposed on and attached to an inner side of the outer cover; and
two conductive wires disposed between the outer cover and the steering wheel along a curve of the steering wheel;
wherein the switch is turned on when a driver rotates the outer cover so that at least one conductive metal piece rotates and connects the two conductive wires in order for electricity to flow between the two conductive wires.

* * * * *